(12) United States Patent
Benians

(10) Patent No.: US 7,000,402 B2
(45) Date of Patent: Feb. 21, 2006

(54) COMPOUND GAS TURBINE ENGINES AND METHODS OF OPERATION THEREOF

(76) Inventor: Hubert Michael Benians, Bleak Cottage, White Horse Lane, Denmead, Waterlooville Hampshire PO7 6JP (GB)

( * ) Notice: Subject to any disclaimer, the term of this patent is extended or adjusted under 35 U.S.C. 154(b) by 193 days.

(21) Appl. No.: 10/482,604

(22) PCT Filed: Jul. 1, 2002

(86) PCT No.: PCT/GB02/03018

§ 371 (c)(1),
(2), (4) Date: Dec. 26, 2003

(87) PCT Pub. No.: WO03/004846

PCT Pub. Date: Jan. 16, 2003

(65) Prior Publication Data

US 2004/0154306 A1 Aug. 12, 2004

(30) Foreign Application Priority Data

Jul. 6, 2001 (GB) .................................. 0116507

(51) Int. Cl.
*F02C 5/00* (2006.01)
(52) U.S. Cl. ...................... 60/776; 60/39.39; 60/39.76
(58) Field of Classification Search ............... 60/39.38, 60/39.39, 39.4, 39.76, 39.78, 776
See application file for complete search history.

(56) References Cited

U.S. PATENT DOCUMENTS

| 1,903,292 | A | | 4/1933 | Holzwarth |
| 2,579,321 | A | * | 12/1951 | Kadenacy .................. 60/39.39 |
| 2,705,867 | A | | 4/1955 | Lewis |
| 2,937,498 | A | * | 5/1960 | Schmidt .................... 60/39.39 |
| 4,693,075 | A | | 9/1987 | Sabatiuk |
| 5,237,811 | A | * | 8/1993 | Stockwell .................. 60/39.39 |
| 5,901,550 | A | | 5/1999 | Bussing |

FOREIGN PATENT DOCUMENTS

| DE | 383286 C | 10/1923 |
| DE | 515635 C | 1/1931 |
| DE | 1014794 | 8/1957 |
| FR | 1131310 A | 2/1957 |
| GB | 296267 | 8/1928 |
| GB | 646302 | 11/1950 |
| GB | 710252 | 6/1954 |
| GB | 892143 | 3/1962 |

* cited by examiner

*Primary Examiner*—Louis J. Casaregola
(74) *Attorney, Agent, or Firm*—John V. Stewart

(57) ABSTRACT

The engine (10) has a compressor (12) for compressing air, a plurality of combustion chambers (22*a–f*) in which fuel mixed with the compressed air combusts, and a turbine (16) which is driven by the products of combustion. Each combustion chamber operates in a cycle comprising the phases of: A. charging the combustion chamber with a charge of compressed air from the compressor while preventing air from escaping from the combustion chamber; B. then compounding by charging with a compounding charge of gas to form a compounded charge; C. then injecting fuel into the combustion chamber so that there is spontaneous ignition and combustion of the fuel with the compounded charge; and D. then exhausting the products of combustion to the turbine. The cycles of the combustion chambers are out of phase in a sequence, and part of the compounded charge (and/or the products of combustion thereof) in each combustion chamber during the combustion phase thereof is transferred to the next combustion chamber in the sequence to provide the compounding charge for that next combustion chamber.

17 Claims, 7 Drawing Sheets

A - CHARGE - say 90 degrees
B - COMPOUND - max. 60 degrees
C - COMBUSTION - max. 60 degrees
D - EXHAUST - say 60 degrees
E - SCAVENGE - remainder

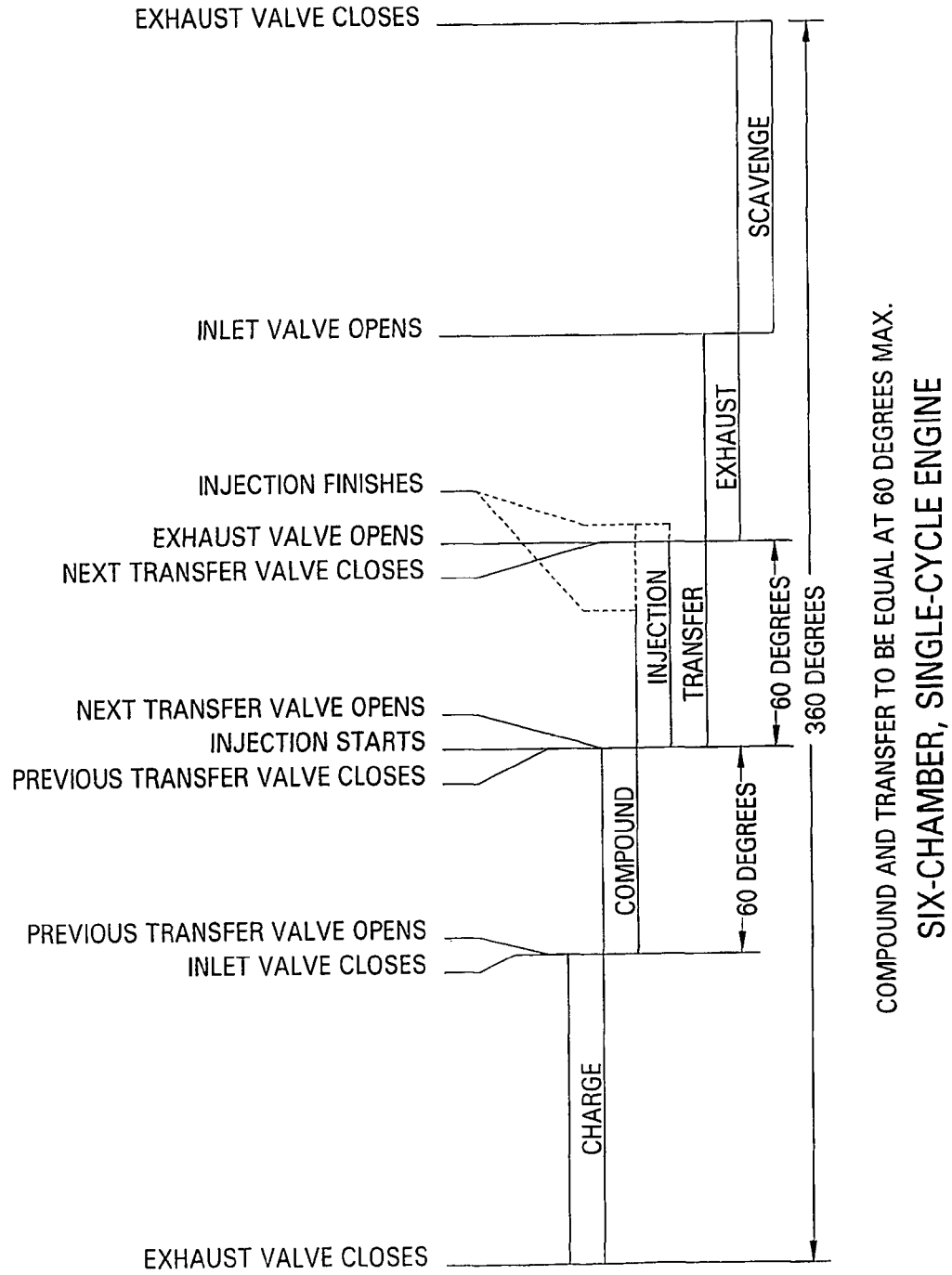

COMPOUND GAS TURBINE ENGINES AND METHODS OF OPERATION THEREOF

This invention relates to engines and to methods of operation thereof.

The invention is applicable to engines of the type having a compressor for compressing air, a plurality of combustion chambers each having at least one fuel injector and in which fuel mixed with the compressed air combusts, and a turbine which is driven by the products of combustion. Such an arrangement forms the basis of a conventional gas turbine engine. Such engines are typically used to produce mechanical power via a power take-off and/or to produce thrust, and the turbine is typically used to drive the compressor.

The thermal efficiency of a conventional gas turbine engine is relatively poor when compared with that of a turbo-charged diesel engine or, more particularly, a compound diesel engine. The reason for the lower thermal efficiency of the gas turbine engine is primarily due to the comparatively low temperature and pressure at which combustion takes place, and these parameters are limited by the pressure ratio of the compressor.

The present invention, or at least specific embodiments of it, is concerned with improving the performance of the gas turbine engine by enabling the temperature and pressure at which combustion takes place to be increased substantially.

In accordance with a first aspect of the present invention, there is provided a method of operation of a gas turbine engine, wherein each combustion chamber operates in a cycle comprising the phases of: charging the combustion chamber with a charge of compressed air from the compressor while preventing air from escaping from the combustion chamber; then compounding by charging with a compounding charge of gas to form a compounded charge; then injecting fuel into the combustion chamber so that there is spontaneous ignition and combustion of the fuel with the compounded charge; and then exhausting the products of combustion to the turbine. The cycles of the combustion chambers are out of phase in a sequence, and part of the compounded charge (and/or the products of combustion thereof) in each combustion chamber during the combustion phase thereof is transferred to the next combustion chamber in the sequence to provide the compounding charge for that next combustion chamber. It will be appreciated that this transfer of a compounding charge from one combustion chamber to the next increases the temperature and pressure by compression of the air in the latter combustion chamber. The ensuing combustion in the latter combustion chamber therefore takes place at an elevated temperature and pressure, thus improving the thermal efficiency of the engine and/or enabling lower grade and/or higher flashpoint fuel to be used.

Patent document GB-A-892143 describes a method of operation of a combustion gas generator that has some similarities to the present invention. However, in the method of GB-A-892143, the charging phase acts solely as a scavenging phase so that the pressure in the combustion chamber at the end of the charging/scavenging phase is somewhere between the compressor outlet pressure and either the turbine back-pressure or atmospheric pressure and is thus comparatively low so that the overall efficiency of the engine is thereby compromised. Furthermore, the method of GB-A-892143 relies on spark-ignition of the air/fuel mixture and is therefore prone to excessively high peak temperatures and pressures before the exhaust phase commences. Moreover, there is a risk of pre-ignition and/or detonation of the air/fuel charge in one combustion chamber by a carry-over flame from the previous combustion chamber during the compounding phase. By contrast, the method of the present invention employs spontaneous ignition, whereby the ensuing combustion can readily be controlled to provide progressive and prolonged fuel burning at generally constant pressure.

Preferably, the cycle of each combustion chamber also includes a phase, between its exhaust phase and its charging phase, of permitting scavenge/cooling air to flow through the combustion chamber from the compressor to the turbine. This serves to scavenge the combustion chamber and also to cool the combustion chamber, any exhaust valves, and the turbine. Preferably, following the end of the scavenging/cooling phase, the duration of the charging phase is such that the pressure of the fresh air charge in the combustion chamber is increased and preferably maximised by a "ram" effect.

Preferably, each combustion chamber is elongate, ie has a length substantially greater than its diameter or its cross-sectional dimensions. In this case, preferably the charging with air takes place at or adjacent one end of each combustion chamber, and the exhausting of the products of combustion takes place at or adjacent the opposite end of each combustion chamber. This serves to encourage stratification along the combustion chamber.

Preferably, the combustion phase for each combustion chamber includes injecting fuel into that combustion chamber. In this case, preferably the transfer of the compounding charge takes place at or adjacent one end of each combustion chamber, and the injection of fuel takes place at or adjacent the other end of each combustion chamber. Accordingly, there is a tendency for the compounding charge to be air, rather than products of combustion.

In accordance with a second aspect of the present invention, there is provided a gas turbine engine, wherein: each combustion chamber is connected to the compressor via a respective inlet port having a respective inlet valve; each combustion chamber is connected to the turbine via a respective exhaust port having a respective exhaust valve; the combustion chambers are arranged as at least one series and in the, or each, series are operable sequentially; each combustion chamber is connected to the next combustion chamber in the, or the respective, series via a respective transfer port having a respective transfer valve; and the engine further comprises means for operating the valves so that the engine operates according to the method of the first aspect of the invention.

Preferably, the valve operating means is operable so that, during the charging phase for each combustion chamber, the inlet valve for that chamber is open and the exhaust valve for that chamber is closed, so as to provide the ram effect mentioned above.

Preferably, the valve operating means is operable to provide a scavenge/cooling phase for each combustion chamber, in which the inlet valve and the exhaust valve for that chamber are both open.

In the arrangement of GB-A-892143, the combustion chambers are arranged as a rotating drum sliding between two stationary ported valve plates. With such an arrangement, it is envisaged that satisfactory sealing of the ports and/or the provision of adequate air or liquid cooling for the combustion chambers in such a rotating assembly would be impracticable. By contrast, in the present invention, each inlet valve, exhaust valve and/or transfer valve preferably comprises a respective poppet valve, piston-operated valve, rotary valve or sleeve valve. Furthermore, the compressor and the turbine preferably each have housings that are fixed relative to the combustion chambers. Designed to contain high combustion pressures, these chambers can therefore form an integral part of the overall engine structure.

In the arrangement of GB-A-892143, the rotating drum of combustion chambers is driven by the turbine shaft so that the porting operates at turbine speed. Accordingly, each sector of turbine blading may always experience the same part of the working cycle, so that some sectors of the turbine blading may be hotter others. This may lead to difficulties with differential heating, carbon build-up and so on. By contrast, in the present invention, the valve operating means is preferably mechanically driven by the turbine via at least one gearbox. Accordingly, it can be arranged that the turbine blading precesses relative to the engine cycle.

Preferably, the compressor is mechanically driven by the turbine via at least one gearbox. This may be particularly advantageous in the case of a centrifugal compressor and an axial turbine.

In the case where each combustion chamber is elongate, preferably each inlet port is disposed at or adjacent one end of the respective combustion chamber, and each exhaust port is disposed at or adjacent the opposite end of the respective combustion chamber.

The engine preferably further includes, for each combustion chamber, at least one respective fuel injector. In this case, preferably each transfer port is disposed at or adjacent one end of the respective combustion chambers, and each fuel injector is disposed at or adjacent the opposite end of the respective combustion chamber.

Each inlet valve, exhaust valve and/or transfer valve preferably comprises a respective poppet valve, piston-operated valve, rotary valve or sleeve valve.

Preferably, the engine further includes a nozzle ring between the exhaust ports and the turbine, the nozzle ring having a plurality of segments each corresponding to a respective one of the combustion chambers. Such segmentation reduces interference between neighbouring turbine inlet nozzle segments and adjacent combustion chambers due to fluctuating pressures.

Specific embodiments of the present invention will now be described, purely by way of example, with reference to the accompanying drawings, in which:

FIG. 5 is a more detailed phase diagram to illustrate the operation of one of the combustion chambers of the engine of FIGS. 1 to 3;

Figure 1:
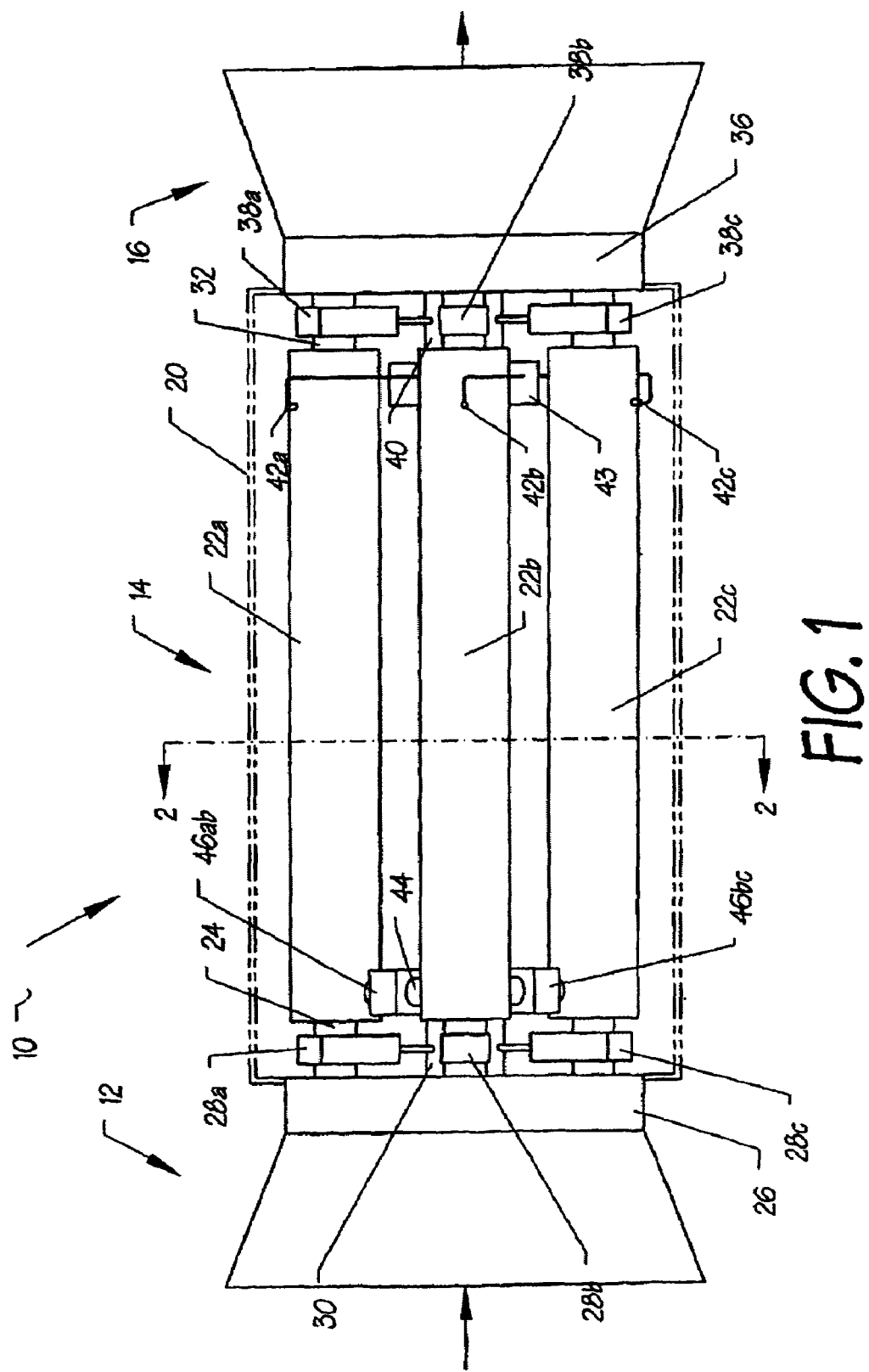
FIG. 1 is a side view of a gas turbine engine with an enclosure of its combustion stage shown in phantom line.

Referring to the drawings, a gas turbine engine 10 has a compressor 12, combustion stage 14 and turbine 16. The compressor 12 and turbine 16 may be of generally conventional design/construction, and each may be a multi-stage unit. The turbine 16 is typically connected to and drives the compressor 12 through shaft 18. A second co-axial shaft 19 is provided for the operation and synchronisation of the auxiliary equipment, including the valves, the fuel injection system, the governor and the lubrication system. Shaft 18 and the co-axial shaft 19 are preferably connected by means of gearing or, in the case of stationary applications, the co-axial shaft 19 may be driven by external means, in which case, the governor must be driven by the shaft 18 in order to control the output speed. The engine 10 may have a mechanical power take-off, for instance in stationary or marine applications, or it may be used as a turboprop engine or as a turbojet or in any other configuration of thrust producing engine. The novelty of the engine 10 lies primarily in the method of compounding in the combustion stage 14.

Figure 2:
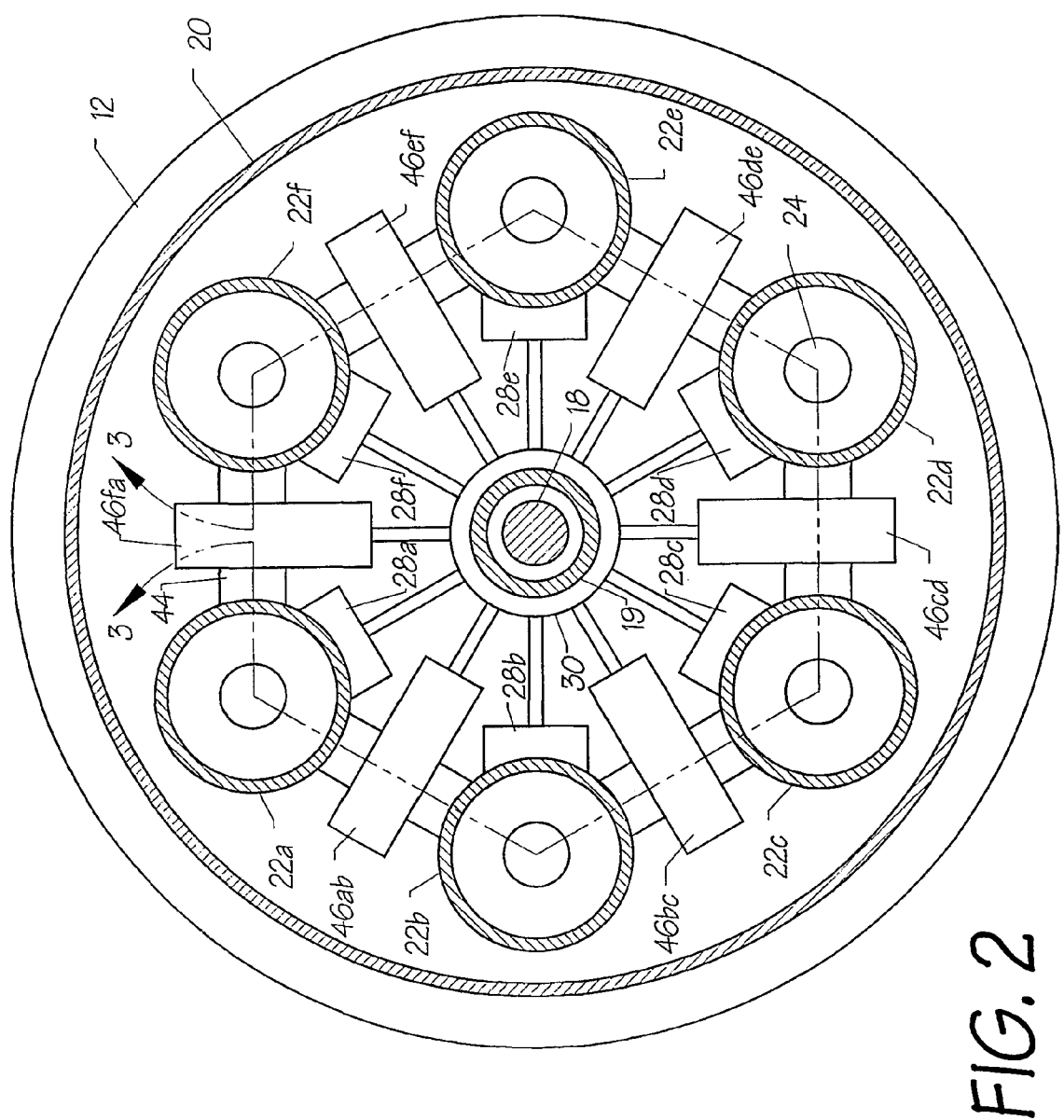
FIG. 2 is a sectioned end view of the engine of FIG. 1, taken along the section line 2—2 shown in FIG. 1, and on a larger scale.
Figure 3:
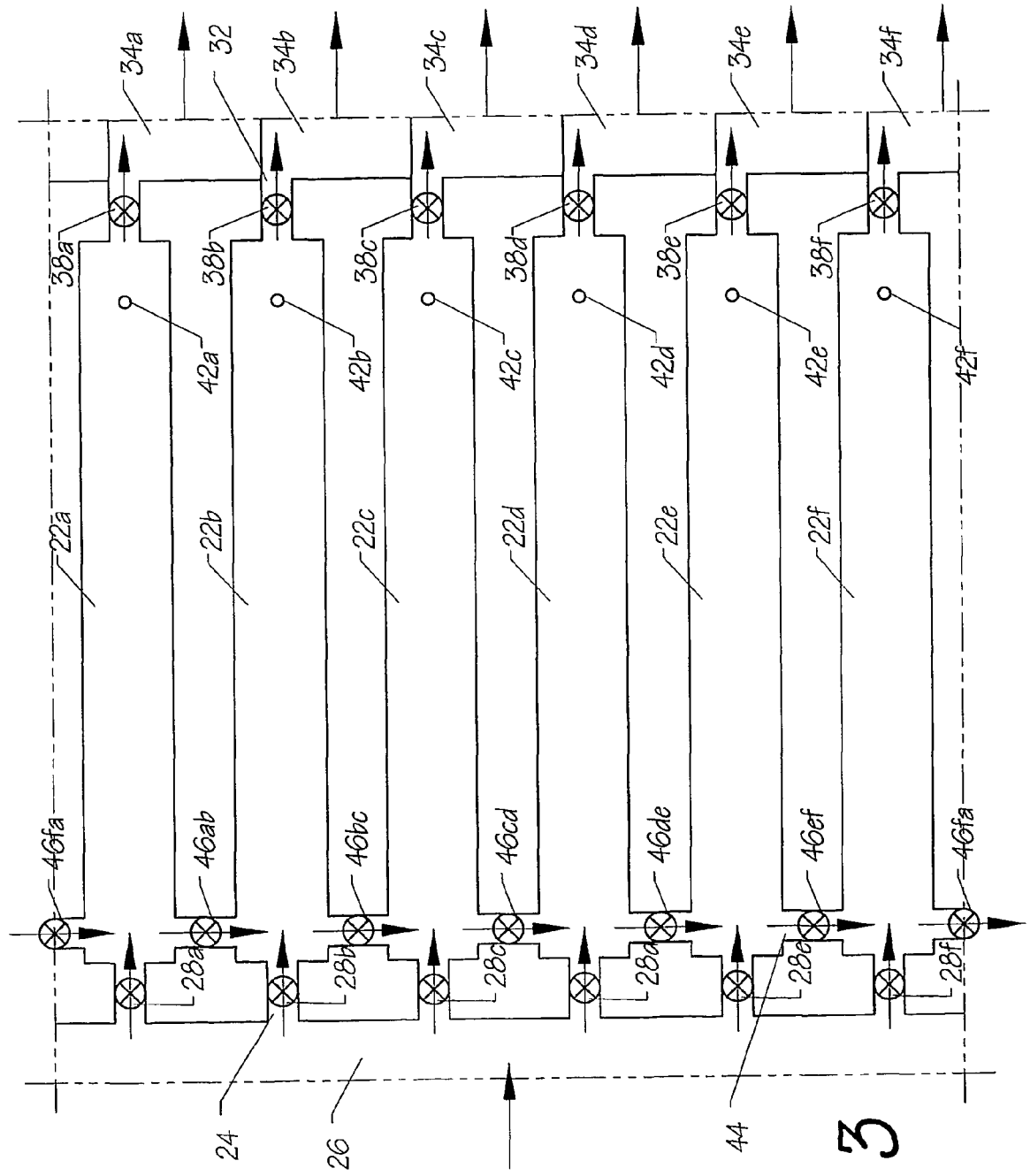
FIG. 3 is a schematic developed view of the engine of FIGS. 1 and 2, taken along the development line 3—3 shown in FIG. 2.

In the configuration of FIGS. 1 to 3, the combustion stage 14 has an enclosure 20, which houses a circular array of six elongate combustion chambers 22*a–f*, or pressure vessels, with their longitudinal axes generally parallel to and arranged around the shafts 18 and 19.

One end of each combustion chamber 22*a–f* is connected via a respective inlet port 24 to a manifold 26 at the outlet of the compressor 12. Each inlet port 24 contains a respective inlet valve 28*a–f* which is operated by an inlet and transfer valve actuator mechanism 30 which may in turn be driven by the co-axial shaft 19. Each inlet valve 28*a–f* may be a poppet valve which is forced open by the actuator mechanism 30, preferably by means of a cam and which is closed by a spring and which is assisted in remaining closed by the pressure in the respective combustion chamber 22*a–f*. Alternatively, other types of inlet valve may be employed including piston, rotary or sleeve operated valves. The other end of each combustion chamber 22*a–f* is connected via a respective exhaust port 32 to a respective segment 34*a–f* of a nozzle ring 36 at the inlet to the turbine 16. Each exhaust port contains a respective exhaust valve 38*a–f* which is operated by an exhaust valve mechanism 40 which may in turn be driven by the co-axial shaft 19. Each exhaust valve 38*a–f* may be a piston operated valve which is operated by the actuator mechanism 40, preferably by means of an eccentric or short stroke crank. Alternatively, other types of exhaust valve may be employed including poppet valves, rotary or sleeve operated valves.

Adjacent the exhaust end of each combustion chamber 22*a–f*, a respective fuel injection nozzle 42*a–f* is provided. The fuel injection nozzles are operated sequentially to inject diesel fuel into the respective combustion chambers 22*a–f* and their timing is controlled by a fuel injection pump 43 driven by (and shown diagrammatically adjacent to) co-axial shaft 19. More than one fuel injection nozzle 42*a–f* may be provided to serve each combustion chamber 22*a–f*. Where the shafts 18,19 are mechanically linked, the fuel injection pump 43 may be an in-line fuel pump fitted with an integral governor, or a rotary distribution fuel pump, again with an integral governor. Alternatively, each chamber 22*a–f* may be supplied with fuel using individual combined fuel pump/injector/nozzle units which in turn may be actuated by co-axial shaft 19, although such an arrangement would require a separate linked governor unit driven by shaft 18 in order to control the output speed.

Adjacent the inlet end of each combustion chamber (e.g. chamber 22*b*), the combustion chamber is connected to the two adjacent combustion chambers (e.g. chambers 22*a*,22*c*) by respective transfer ports 44. Each transfer port 44 contains a respective transfer valve 46*ab*,46*bc*,46*cd*,46*de*,46*ef*, 46*fa* which is operated by the inlet and transfer valve actuator mechanism 30. Each transfer valve 46ab,46bc, 46cd,46de,46ef 46fa may be a piston valve which is operated by the actuator mechanism 30, preferably by means of an eccentric or short stroke crank. Alternatively, other types of transfer valve may be employed, including rotary or sleeve operated valves.

The inlet and transfer valve actuator mechanism 30 has been considered above and shown schematically as a single unit operated by the co-axial shaft 19, but in practice separate units or mechanisms may be provided for actuating the inlet valves 28a–f and for actuating the transfer valves 46ab,46bc,46cd,46de,46ef,46fa.

Whilst it has been stated earlier that the co-axial shaft 19 may either be driven through gearing by the shaft 18 or alternatively driven by external means, it is foreseen that provision would also be made for small variations in the respective valve timings and/or the respective fuel injection timings to meet different operating conditions, whilst still maintaining overall synchronisation of the auxiliary functions. It is also foreseen that the gear ratio between shaft 18 and the auxiliary co-axial drive shaft 19 must be chosen such that the sequence of functions taking place in the combustion chambers will be out of synchronisation with, or multiples of, turbine rotational speed. This will ensure, for example, that the exhaust pulses will be constantly precessing in relation to the rotation, or multiples of revolutions, of the turbine blading, irrespective of the relative speeds or directions of shaft rotation, with a view to minimizing differential heat stresses.

The operation of the engine in the steady state of the six chamber configuration depicted in FIGS. 1 to 3 is now described assuming the starting point where, say, the inlet valve 28c of combustion chamber 22c is open, its exhaust valve 38c is on the verge of closing, and scavenging/cooling is about to cease; its transfer valve 46cd to the next combustion chamber 22d is closed, its transfer valve 46bc from the previous combustion chamber 22b is closed, no fuel is being injected at nozzle 42c;

combustion chamber 22b leads combustion chamber 22c by one sixth of a cycle; and combustion chamber 22d lags behind combustion chamber 22c by one sixth of a cycle.

From the starting point, the operational phases A to E of the engine and the transitions between them, AB, BC, CD, DE, EA, insofar as the combustion chamber 22c is concerned, are as follows:

Transition E–A: The exhaust valve 38c closes to end the scavenging/cooling phase.

Phase A: Charge. Air continues to flow from the compressor outlet manifold 26 through the open inlet valve 28c into the combustion chamber 22c until the pressure therein approaches that of the compressor outlet manifold.

Transition A–B: As the pressure in the combustion chamber 22c generally reaches the compressor outlet manifold pressure, the inlet valve 28c closes and the transfer valve 46bc connecting with the previous combustion chamber 22b opens.

Phase B: Compound. High pressure air and/or products of combustion flow from the previous combustion chamber 22b (under approximately constant pressure conditions, maintained by fuel injection into combustion chamber 22b), highly compressing the air in combustion chamber 22c and thereby substantially raising the temperature and pressure of the air charge in combustion chamber 22c, in anticipation of fuel injection.

Transition B–C. The transfer valve 46bc connecting with the previous combustion chamber 22b closes. Fuel injection through nozzle 42c into combustion chamber 22c is initiated as the transfer valve 46cd connecting with the next combustion chamber 22d opens.

Phase C: Combustion. Spontaneous ignition and combustion of the fuel/air takes place due to the existing high temperature and pressure in the combustion chamber 22c. During combustion, high pressure air and/or products of combustion flow from the combustion chamber 22c at approximately constant pressure into the next combustion chamber 22d thereby providing the compounding pulse phase B for the next combustion chamber 22d.

Transition C–D: As fuel injection from nozzle 42c into combustion chamber 22c satisfies the power requirement, and transfer to the next chamber is completed, the transfer valve 46cd connecting with combustion chamber 22d closes. The exhaust valve 38c opens.

Phase D: Exhaust. The high pressure residual products of combustion exhaust from the combustion chamber 22c via the nozzle segment 34c to the turbine 16, and the pressure in the combustion chamber 22c drops.

Transition D–E: The inlet valve 28c opens.

Phase E: Scavenge. Air flows from the compressor outlet manifold 26 through the inlet valve 28c, through the combustion chamber 22c and the exhaust valve 38c thereby providing uniflow scavenge of the combustion chamber 22c as well as providing cooling of the combustion chamber 22c, the exhaust valve 38c, the turbine nozzle segment 34c and the turbine 16.

Transition E–A: This is a repeat of the transition E–A described at the beginning of section.

Figure 4:
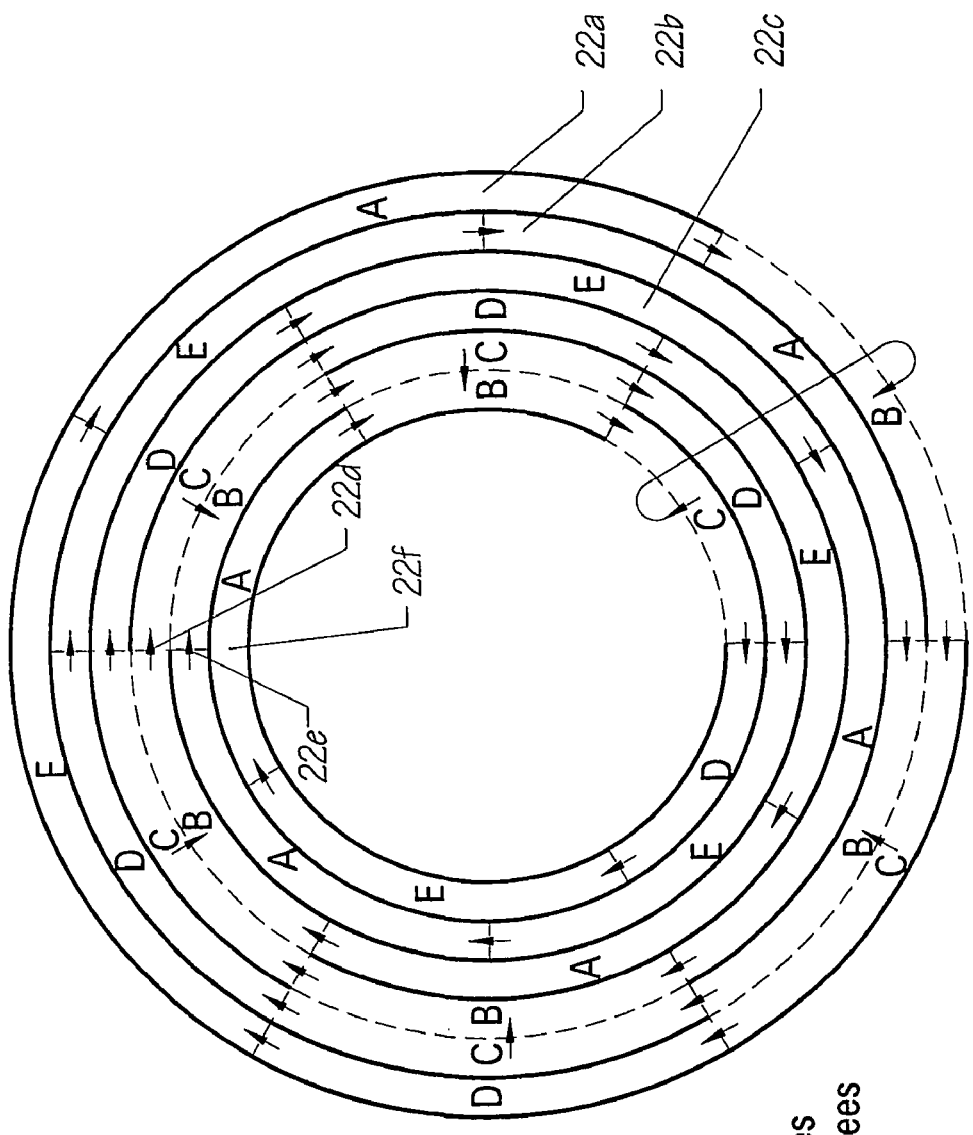
FIG. 4 is a phase diagram to illustrate one mode of operation of the engine of FIGS. 1 to 3.
Figure 7:
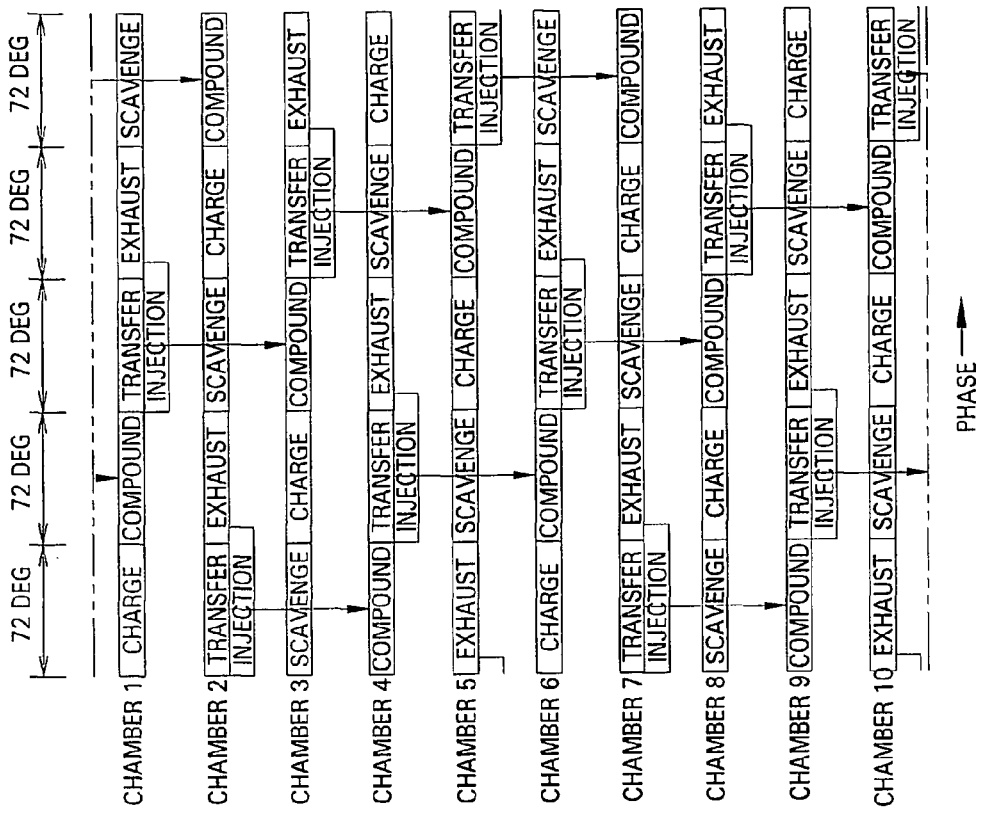
FIG. 7 is a phase diagram to illustrate the operation of the combustion chambers of the engine of FIG. 6.
Figure 6:
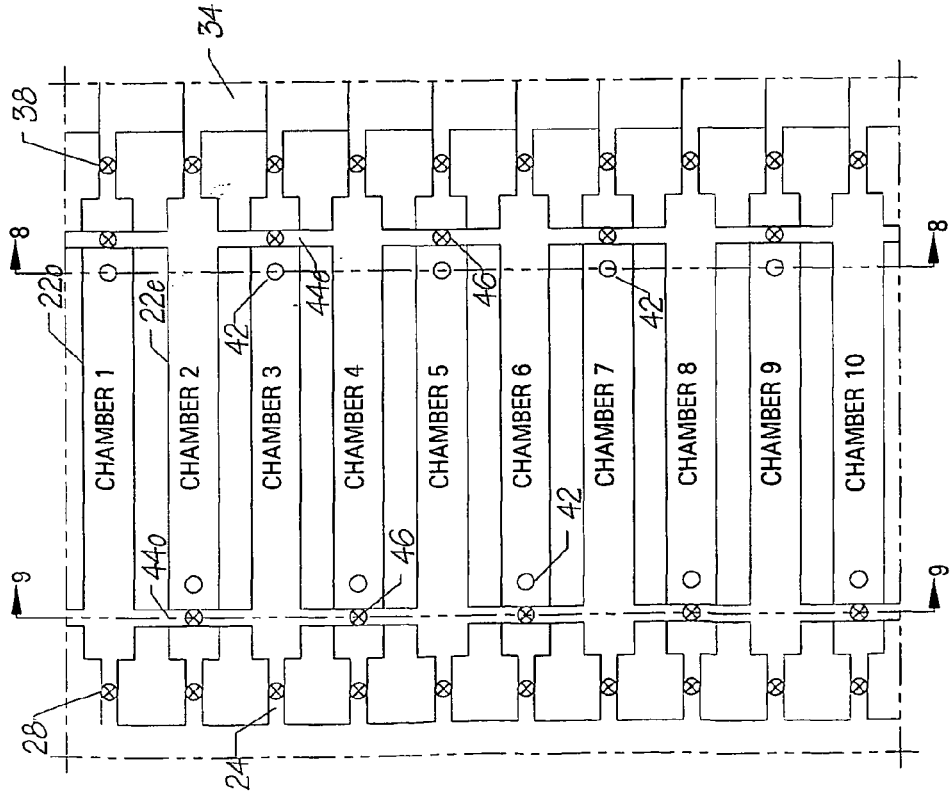
FIG. 6 is similar to FIG. 3, but for a different configuration of engine.
Figure 9:
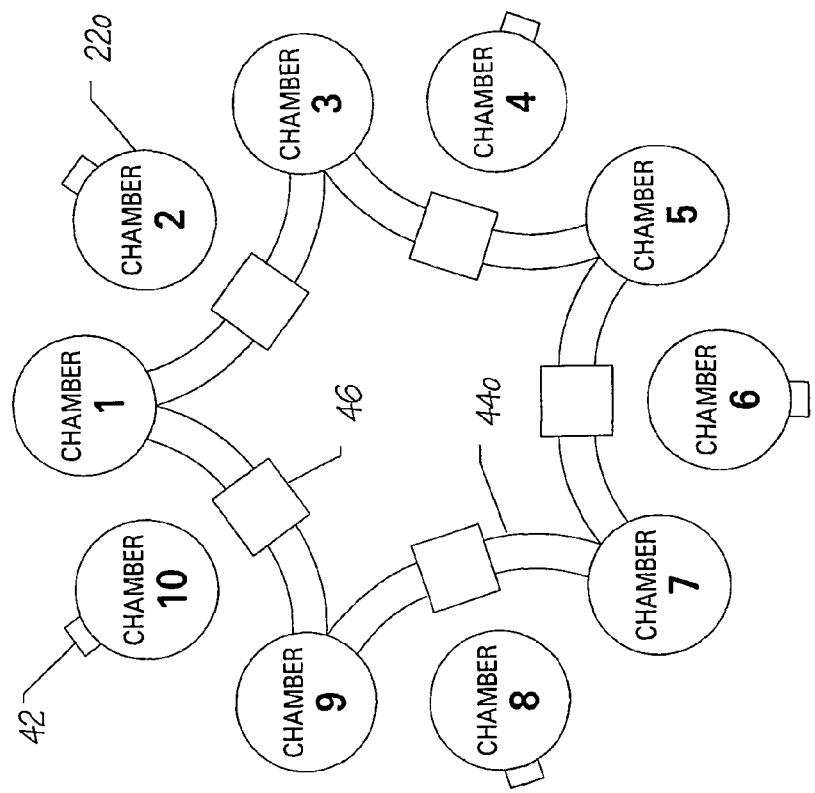
FIG. 9 is a schematic developed view taken on the line 9—9 in FIG. 6.
Figure 8:
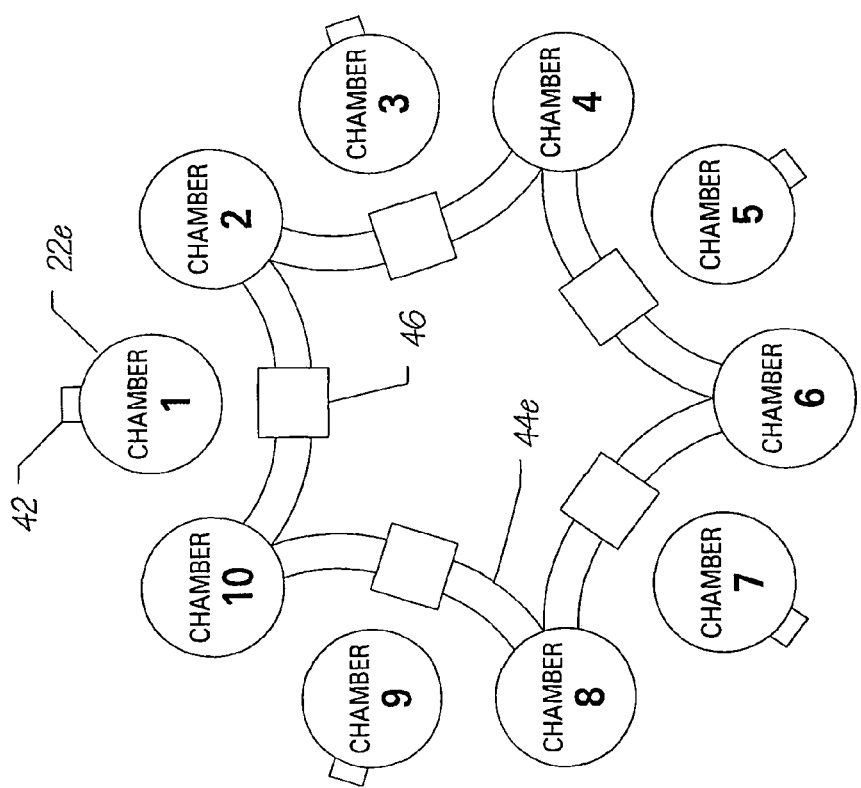
FIG. 8 is a schematic developed view taken on the line 8—8 in FIG. 6.

These phases for all six of the combustion chambers 22a–f are shown in FIG. 4. The relative lengths of the phases A to E are shown in FIG. 4 as: A—90°; B—60°; C—60°; D—60°; and E—90°. Nevertheless, the relative phases of A, D and E may vary considerably from those shown in FIG. 4 although the compounding phase B and the combustion/transfer stage C are equal and limited to a maximum of 60° for the six combustion chamber configuration.

FIG. 5 is a more detailed cycle diagram for any one of the combustion chambers 22. Again it shows that the compounding phase B and the combustion/transfer phase C are equal and limited to 60°. Fuel injection is shown diagrammatically to commence with the start of transfer and the rate of fuel injection is intended to maintain approximately constant pressure throughout the combustion and transfer phase. Normally, fuel injection will be completed before the end of the transfer phase, leaving sufficient tolerance for the governor to maintain the required speed/power output to match the engine load. It will be appreciated, however, that the configuration lends itself to a wide range of predetermined rates of fuel injection and timing such that under certain operating conditions injection may commence marginally before the start of transfer or it may end marginally after the end of transfer.

As mentioned previously, each combustion chamber 22a–f is elongate, ie its length between its inlet ports 24 and its exhaust ports 32 is substantially greater than its diameter or cross-sectional dimensions. Furthermore, the fuel injectors 42a–f and the transfer ports 44 are located at opposite ends of each combustion chamber in order to provide optimum stratification between charge air and the residual products of combustion. When fuel is injected during the combustion phase C, combustion will tend to be concentrated at the same end as the injection nozzle whereas the charge air will be concentrated at the transfer port end of the chamber. Therefore, the air/gas which is transferred to the next combustion chamber in the sequence will have a high concentration of unburned air. For the six-combustion chamber single cycle engine shown in FIGS. 1, 2, 3, 4 and 5 the transfer ports are located adjacent the inlet ports and the injection nozzles are located adjacent the exhaust ports. Although this is the preferred arrangement, it will be appreciated that stratification can also be achieved if the injection nozzles are adjacent the inlet valves and the transfer ports are adjacent the exhaust valves. This is the subject of an alternative double cycle or duplex engine described later with reference to FIGS. 6 to 9.

The engine 10 described above is preferably used at near constant speed and/or with near constant power output. It requires additional equipment for starting, such as a means of cranking it up to operating speed and may require the introduction or injection of a volatile fuel with synchronised spark ignition, until the compression ignition cycle can be sustained.

In the engine 10 described above, the enclosure 20 may serve to collect used lubricating oil, for example on a dry sump basis, and to carry additional cooling air bled from the compressor and exhausted into a late turbine stage. This bleed air may be used for additional external cooling for the combustion chambers and, particularly for the transfer ports and their respective valves. The enclosure 20 may also be used to contain and vent any gas leaks which may occur, for example at the inlet poppet valve stems or past the piston rings of the transfer and exhaust valves. The external surfaces of the combustion chambers 22a–f may be provided with radial, longitudinal or spiral finning to assist in cooling and/or the combustion chambers 22a–f may be provided with liquid cooling. In the case where longitudinal finning is employed, the combustion chambers may be formed by extrusion.

It is envisaged that the ideal application for this engine, to take full advantage of the improved efficiency, would be for electrical generation, particularly standby generation and for marine propulsion and the associated marine auxiliary engines, in each case using a geared mechanical power take-off. The engine may also be developed for aircraft propulsion, in turboprop, turbojet and other configurations, where the improved efficiency can be shown to offset any increase in weight and where the engine would provide improved safety by using high flashpoint, low grade diesel fuels.

Many modifications and developments may be made to the embodiment of the invention described above. For instance, six combustion chambers 22a–f have been shown merely by way of example, and other numbers of combustion chambers may be provided. As previously stated the auxiliary functions including the valves and fuel injection equipment may be operated by the co-axial gear driven shaft 19 or, in stationary installations, the co-axial shaft 19 may be driven by external means such as an electric motor so that the speed of operation of the valves and injection equipment can be controlled more easily independently of the speed of the gas turbine shaft 18. The speed of such a motor may be controlled so as to provide precession between the working cycles of the combustion chambers and the turbine. In either case, the governor must be linked to the shaft 18 in order to control the output speed. Whether the shaft 19 is linked mechanically through gearing to shaft 18, or driven by external means, it is foreseen that the absolute and/or the relative timing of the auxiliaries may be varied, for example by providing automatic or manually-operable advance/retard mechanisms or systems, to fine tune the engine performance in respect of variations in load/speed.

In the embodiment described above, the combustion chambers are operated in a single cycle, and it will be appreciated that this produces an unbalanced axial load on the turbine. Alternatively, the combustion chambers may be operated in a double cycle where an engine has say ten combustion chambers such that diametrically opposite chambers are synchronized by using double lobe cams to actuate opposing valves, instead of eccentrics or short stroke cranks. Accordingly, it will be appreciated that, at any time when one of the combustion chambers is in its exhaust phase, the diametrically opposite combustion chamber will also be in its exhaust phase such that the axial loads on the turbine are balanced. However, it will also be appreciated that the effective combustion and transfer phases are being shortened with the increase in number of chambers, in this case being limited to a maximum of 36°, so an alternative layout is proposed below and this is shown in FIGS. 6 to 9.

FIGS. 6 to 9 show that a balanced arrangement can be achieved by providing say ten combustion chambers in a double series of five interposed chambers. In this example, alternate chambers are linked for transfer and this configuration allows a maximum of 72° for each combustion/transfer phase and also allows the use of eccentrics or short stroke cranks for the control of the transfer and exhaust valves. Odd numbered chambers 22o are connected to each other by transfer ports 44o and even numbered chambers 22e are connected by transfer ports 44e. The valve and injection timing is arranged such that diametrically opposite chambers are always performing the same operation and thereby preserve the axial balance. Other features of the engine of FIGS. 6 to 9 are referenced with the same reference numerals as those used above in relation to FIGS. 1 to 5.

It has been stated that the shaft 18 may provide a direct drive between the turbine and the compressor, whilst gearing between concentric shafts 18,19 ensures that the engine combustion cycles precess in relation to the turbine rotation. Alternatively, in order to match the characteristics of the compressor accurately with those of the turbine, for example where a centrifugal compressor and axial compressor are used, gearing may be included at each end of the shaft 19, in which case there is no need for the shaft 18. Such an arrangement is preferred to allow for the pre-selection of optimum speed ratios between the compressor, the auxiliaries and the turbine. It also permits the use of short stroke cranks along the shaft 19 for the operation of the piston valves via connecting rods.

Although the turbine has been described above as a single unit, alternatively two turbines may be employed, one to drive the compressor and the auxiliaries, and the other to provide a mechanical output.

It should be noted that the embodiments of the invention have been described above purely by way of example and that many other modifications and developments may be made thereto within the scope of the present invention.

The invention claimed is:
1. A method of operation of a gas turbine engine (10) having a compressor (12) for compressing air, a plurality of combustion chambers (22a–f) in which fuel mixed with the compressed air combusts, and a turbine (16) which is driven by the products of combustion, wherein:
   (i) each combustion chamber operates in a cycle comprising the phases of:

A. charging the combustion chamber with a charge of compressed air from the compressor while preventing air from escaping from the combustion chamber;

B. then compounding by charging with a compounding charge of gas to form a compounded charge;

C. then commencing injection of fuel into the combustion chamber so that there is spontaneous ignition and combustion of the fuel with the compounded charge at generally constant pressure; and D. then exhausting the products of combustion to the turbine;

(ii) the cycles of the combustion chambers are out of phase in a sequence; and (iii) part of the compounded charge (and/or the products of combustion thereof) in each combustion chamber during the combustion phase thereof is transferred before the exhaust phase thereof to the next combustion chamber in the sequence to provide the compounding charge for that next combustion chamber.

2. A method as claimed in claim 1, wherein the cycle of each combustion chamber also includes a phase E, between its exhaust phase D and its charging phase A, of permitting scavenge/cooling air to flow through the combustion chamber from the compressor to the turbine.

3. A method as claimed in claim 2, wherein, following the end of the scavenging/cooling phase, the duration of the charging phase is such that the pressure of the fresh air charge in the combustion chamber is increased and preferably maximised by a "ram" effect.

4. A method as claimed in claim 1, wherein each combustion chamber is elongate.

5. A method as claimed in claim 4, wherein:
the charging with air takes place at or adjacent one end of each combustion chamber; and
the exhausting of the products of combustion takes place at or adjacent the opposite end of each combustion chamber.

6. A method as claimed in claim 4, wherein:
the transfer of the compounding charge takes place at or adjacent one end of each combustion chamber; and
the injection of fuel takes place at or adjacent the other end of each combustion chamber.

7. A gas turbine engine (10) comprising:
a compressor (12) for compressing air;
a plurality of combustion chambers (22a–f) each having at least one fuel injector (42a–f) and in which fuel mixed with the compressed air can combust; and
a turbine (16) which is driven by the products of combustion;
wherein:
each combustion chamber is connected to the compressor via a respective inlet port (24) having a respective inlet valve (28a–f);
each combustion chamber is connected to the turbine via a respective exhaust port (32) having a respective exhaust valve (38a–f);
the combustion chambers are arranged as at least one series and in the, or each, series are operable sequentially;
each combustion chamber is connected to the next combustion chamber in the, or the respective, series via a respective transfer port (44) having a respective transfer valve (46ab,46,bc,46cd,46de,46ef,46fa); and
the engine further comprises means (30) for operating the valves so that the engine operates such that: each combustion chamber operates in a cycle comprising the phases of:

charging the combustion chamber with a charge of compressed air from the compressor while preventing air from escaping from the combustion chamber; then compounding by charging with a compounding charge of gas to form a compounded charge;

then commencing injection of fuel into the combustion chamber so that there is spontaneous ignition and combustion of the fuel with the compounded charge at generally constant pressure; and then exhausting the products of combustion to the turbine;

the cycles of the combustion chambers are out of phase in a sequence; and part of the compounded charge (and/or the products of combustion thereof) in each combustion chamber during the combustion phase thereof is transferred before the exhaust phase thereof to the next combustion chamber in the sequence to provide the compounding charge for that next combustion chamber.

8. An engine as claimed in claim 7, wherein the valve operating means is operable so that, during the charging phase for each combustion chamber, the inlet valve for that chamber is open and the exhaust valve for that chamber is closed.

9. An engine as claimed in claim 7, wherein the valve operating means is operable so that the cycle of each combustion chamber also includes a phase, between its exhaust phase and its charging phase, of permitting scavenge/cooling air to flow through the combustion chamber from the compressor to the turbine, and during the scavenge/cooling phase for each combustion chamber, the inlet valve and the exhaust valve for that chamber are both open.

10. An engine as claimed in claim 7, wherein the compressor and the turbine each have housings that are fixed relative to the combustion chambers.

11. An engine as claimed in claim 7, wherein each inlet valve, exhaust valve and/or transfer valve comprises a respective poppet valve, piston-operated valve, rotary valve or sleeve valve.

12. An engine as claimed in claim 7, wherein the valve operating means is mechanically driven by the turbine via at least one gearbox.

13. An engine as claimed in claim 7, wherein the compressor is mechanically driven by the turbine via at least one gearbox.

14. An engine as claimed in claim 7, wherein each combustion chamber is elongate.

15. An engine as claimed in claim 14, wherein:
each inlet port is disposed at or adjacent one end of the respective combustion chamber; and
each exhaust port is disposed at or adjacent the opposite end of the respective combustion chamber.

16. An engine as claimed in claim 14, wherein:
each transfer port is disposed at or adjacent one end of the respective combustion chambers; and
each fuel injector is disposed at or adjacent the opposite end of the respective combustion chamber.

17. An engine as claimed in claim 7, further including a nozzle ring (36) between the exhaust ports and the turbine, the nozzle ring having a plurality of segments (34a–f) each corresponding to a respective one of the combustion chambers.

* * * * *